(12) United States Patent
Condorelli et al.

(10) Patent No.: US 8,613,111 B2
(45) Date of Patent: Dec. 17, 2013

(54) CONFIGURABLE INTEGRATED TAMPER DETECTION CIRCUITRY

(75) Inventors: Vincenzo Condorelli, Poughkeepsie, NY (US); Silvio Dragone, Winterthur (CH); Tamas Visegrady, Zurich (CH)

(73) Assignee: International Business Machines Corporation, Armonk, NY (US)

( * ) Notice: Subject to any disclaimer, the term of this patent is extended or adjusted under 35 U.S.C. 154(b) by 265 days.

(21) Appl. No.: 13/096,381

(22) Filed: Apr. 28, 2011

(65) Prior Publication Data

US 2012/0278905 A1 Nov. 1, 2012

(51) Int. Cl.
*G06F 21/00* (2013.01)

(52) U.S. Cl.
USPC .......................................... 726/34; 361/654

(58) Field of Classification Search
USPC ........................................................ 361/654
See application file for complete search history.

(56) References Cited

U.S. PATENT DOCUMENTS

| | | | |
|---|---|---|---|
| 3,594,770 | A | 7/1971 | Ham et al. |
| 5,027,397 | A | 6/1991 | Double et al. |
| 6,853,093 | B2 | 2/2005 | Cohen et al. |
| 6,957,345 | B2 | 10/2005 | Cesana et al. |
| 7,615,416 | B1 | 11/2009 | Chock |
| 2003/0009683 | A1* | 1/2003 | Schwenck et al. ............ 713/194 |
| 2006/0087883 | A1* | 4/2006 | Ozguz et al. ............. 365/185.04 |
| 2006/0271792 | A1* | 11/2006 | Devadas et al. ............... 713/189 |
| 2007/0177363 | A1 | 8/2007 | Jayanetti |

OTHER PUBLICATIONS

Authur Cayley, "On the Colouring of Maps", from the Proceedings of the Royal Geographical Society, vol. I., No. 4 (1879), pp. 259-261.
Steve H. Weingart; "Physical Security Devices for Computer Subsystems: a Survey of Attacks and Defenses 2008;" White Paper, Atsec, Mar. 2008; pp. 1-17.

* cited by examiner

*Primary Examiner* — David Pearson
(74) *Attorney, Agent, or Firm* — Cantor Colburn LLP; Daniel Morris

(57) ABSTRACT

Tamper detection circuitry includes a first surface layer surrounding a protected memory, the first surface layer comprising a first plurality of conductive sections; a second surface layer surrounding the protected memory, the second surface layer comprising a second plurality of conductive sections; a programmable interconnect located inside the first surface layer, the programmable interconnect being connected to each conductive section by a plurality of conductive traces, the programmable interconnect being configured to group the conductive section of the first and second plurality of conductive sections into a plurality of circuits, each of the plurality of circuits having a different respective voltage; and a tamper detection module, the tamper detection module configured to detect tampering in the event that a conductive section that is part of a first circuit comes into physical contact with a conductive section that is part of a second circuit.

18 Claims, 10 Drawing Sheets

800

```
DETERMINE POSSIBLE SWITCH CONFIGURATIONS
FOR PROGRAMMABLE INTERCONNECT BASED ON RANDOM NUMBER GENERATOR
801
```

```
ANALYZE POSSIBLE SWITCH CONFIGURATIONS TO SELECT AN
APPROPRIATE CONFIGURATION
802
```

```
CONFIGURE SWITCHES IN PROGRAMMABLE INTERCONNECT ACCORDING TO
SELECTED CONFIGURATION
803
```

FIG. 8

CONFIGURABLE INTEGRATED TAMPER DETECTION CIRCUITRY

BACKGROUND

This disclosure relates generally to the field of protection of computer memory from unauthorized physical intrusion, or tampering, and more particularly to an integrated security enclosure for computer memory with improved tamper detection circuitry.

Sensitive data must be protected from access by unauthorized users. A software protection system may allow only selected users to access sensitive data through the use of passwords or other user identification methods. Security-relevant data, such as passwords and encryption keys, needs to be protected even more carefully from unauthorized access. However, software control and protection methods may not be enough to stop an experienced person from bypassing such protections and tampering with the memory components in which the security data is stored by, for example, direct interrogation of memory components containing the security data. Therefore, such memory components must be physically protected.

Tamper detection circuitry may detect physical intrusion attempts on a protected memory. If an attempted physical intrusion within a protected memory area is detected, an alarm may be given by the tamper detection circuitry, or the sensitive data stored in the protected memory may be destroyed to avoid loss of secrecy. Non-integrated tamper detection circuitry be implemented as an intrusion barrier made of a screen material or a tamper-responding matrix surrounding the chip or circuit board containing the protected memory. Tamper detection circuitry may alternately be integrated into a chip or circuit board containing the protected memory. Integrated tamper detection circuitry may be manufactured with finer resolution than non-integrated tamper detection circuitry. However, integrated tamper detection circuitry may have relatively low manufacturing variation as compared to non-integrated tamper protection circuitry. Therefore, even if physical probes that may be used for tampering do not have the resolution of state-of-the-art integrated tamper detection circuitry, the regularity and predictability of the structures that make up integrated tamper detection circuitry may limit the protections afforded by the integrated tamper detection circuitry.

BRIEF SUMMARY

In one aspect, tamper detection circuitry for a protected memory includes a first surface layer surrounding the protected memory, the first surface layer comprising a first plurality of conductive sections; a second surface layer surrounding the protected memory, the second surface layer being located outside of the first surface layer, the second surface layer comprising a second plurality of conductive sections; a programmable interconnect located inside the first surface layer, the programmable interconnect being connected to each conductive section of the first and second plurality of conductive sections by a plurality of conductive traces, the programmable interconnect comprising a plurality of switches that are configured to group the conductive section of the first and second plurality of conductive sections into a plurality of circuits, each of the plurality of circuits having a different respective voltage; and a tamper detection and response module, the tamper detection and response module configured to detect tampering in the event that a conductive section that is part of a first circuit comes into physical contact with a conductive section that is part of a second circuit.

In another aspect, a method for configuring tamper detection circuitry for a protected memory, the tamper detection circuitry comprising a programmable interconnect comprising a plurality of switches, the programmable interconnect being connected to a first surface layer surrounding the protected memory, the first surface layer comprising a first plurality of conductive sections, and a second surface layer surrounding the protected memory, the second surface layer being located outside of the first surface layer, the second surface layer comprising a second plurality of conductive sections, wherein the first and second plurality of conductive sections are connected to the programmable interconnect by a plurality of conductive traces includes determining a plurality of possible switch configurations for the programmable interconnect, wherein the plurality of possible switch configurations each correspond to different groupings of the first and second plurality of conductive sections into a plurality of circuits; selecting a switch configuration from the plurality of switch configurations; and committing the selected switch configuration to the switches that comprise the programmable interconnect such that the first and second plurality of conductive sections are grouped into a plurality of circuits corresponding to the selected switch configuration, wherein each of the plurality of circuits has a different respective voltage.

In another aspect, a computer program product comprising a computer readable storage medium containing computer code that, when executed by a computer, implements a method for configuring tamper detection circuitry for a protected memory, the tamper detection circuitry comprising a programmable interconnect comprising a plurality of switches, the programmable interconnect being connected to a plurality of conductive sections by a plurality of conductive traces, wherein the method includes determining a plurality of possible switch configurations for the programmable interconnect, wherein the plurality of possible switch configurations each correspond to different groupings of the conductive sections into a plurality of circuits; selecting a switch configuration from the plurality of switch configurations; and committing the selected switch configuration to the switches that comprise the programmable interconnect such that the conductive sections are grouped into a plurality of circuits corresponding to the selected switch configuration, wherein each of the plurality of circuits has a different respective voltage.

Additional features are realized through the techniques of the present exemplary embodiment. Other embodiments are described in detail herein and are considered a part of what is claimed. For a better understanding of the features of the exemplary embodiment, refer to the description and to the drawings.

BRIEF DESCRIPTION OF THE SEVERAL VIEWS OF THE DRAWINGS

Referring now to the drawings wherein like elements are numbered alike in the several FIGURES:

FIG. 8 illustrates a method for switch configuration for integrated tamper detection circuitry.

DETAILED DESCRIPTION

Embodiments of configurable integrated tamper detection circuitry, and methods of configuring integrated tamper detection circuitry, are provided, with exemplary embodiments being discussed below in detail. Configurable integrated tamper detection circuitry combines prefabricated, tamper-sensitive surfaces made up of a plurality of conductive sections, or strips, with a programmable interconnect including a network of configurable switches, allowing electrical connections between the conductive sections that make up the tamper-sensitive surfaces to be configured in a nondeterministic or randomized fashion, thereby increasing the effectiveness of the configurable integrated tamper detection circuitry. The configuration of the programmable interconnect changes the externally observable electrical configuration of the prefabricated, tamper-sensitive surfaces that make up the integrated tamper detection circuitry. The programmable interconnect therefore provides a device-unique electrical configuration for the integrated tamper detection circuitry, while the prefabricated, tamper-sensitive surfaces provide a regular physical structure for ease of manufacturing. Configurable integrated tamper detection circuitry may have tamper-detection characteristics such as spatial variation in sensitivity and high variation in steady-state voltage across the tamper-sensitive surfaces.

Figure 1:
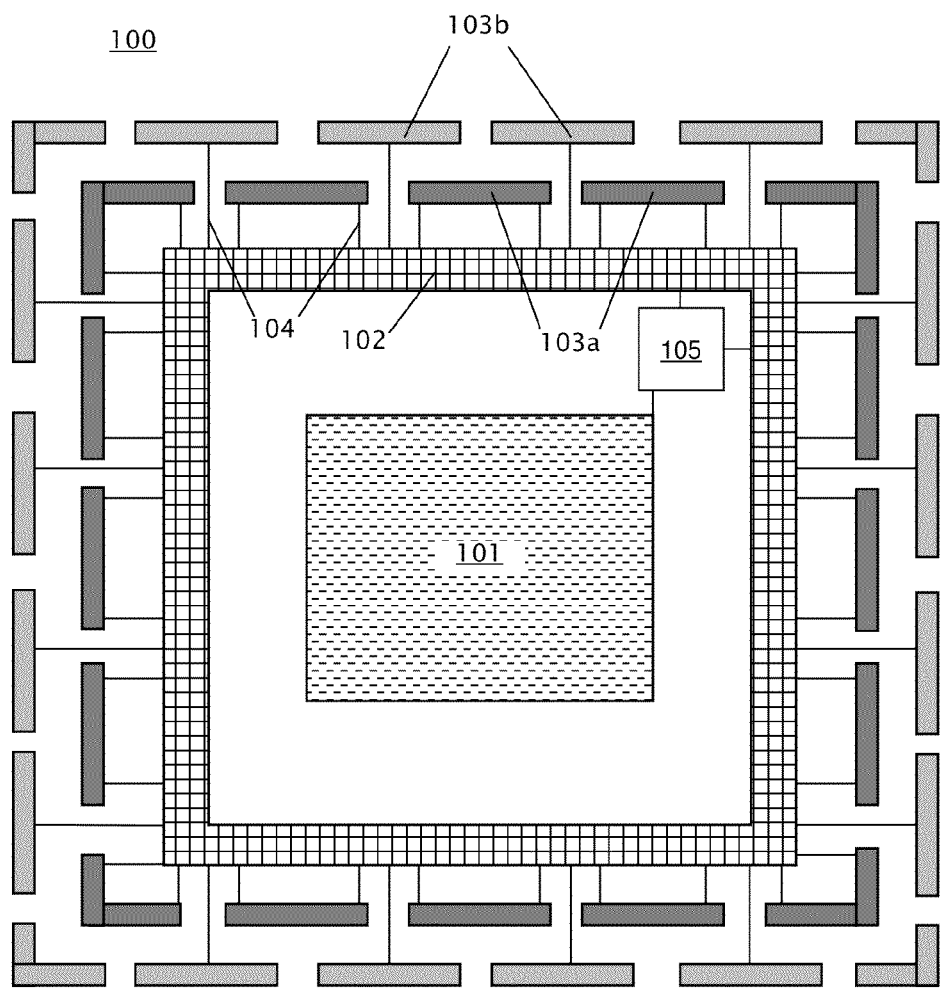
FIG. 1 illustrates a top cross section of an embodiment of configurable integrated tamper detection circuitry.

A top cross section of an embodiment of configurable integrated tamper detection circuitry is illustrated in FIG. 1. The configurable integrated tamper detection circuitry is located on a chip or circuit board that includes a protected memory 101. Protected memory 101, which may contain any appropriate sensitive data, is located inside a programmable interconnect 102. The programmable interconnect 102 comprises a set of electrical switches. The programmable interconnect 102 may include any appropriate number, type, and layout of persistent switches, such as electrically controlled fuses. Programmable interconnect 102 is connected to external surface layers, each made up of a plurality of tamper-sensitive surfaces, or conductive sections, such as exemplary conductive sections 103a-b, via conductive traces 104. The programmable interconnect 102 allows significant freedom in forming circuits of conductive sections. The programmable interconnect 102 may be selectively set to particular configurations, forming circuits of conductive sections. A randomized switch configuration for programmable interconnect 102 may be generated based on, for example, an internal or external random-number generator (RNG), as discussed below in more detail with respect to FIG. 8. An internal RNG may be used for increased security; an external RNG may be used in conjunction with configurable integrated tamper detection circuitry that is configured in, for example, a secured manufacturing vault. The circuits of conductive sections may be configured to maximize local potential (i.e., voltage) differences between adjacent conductive sections, in turn maximizing the area where a conductive section will short-circuit if deformed or pressed such that the conductive section comes into contact with one or more adjacent conductive sections.

Figure 2:
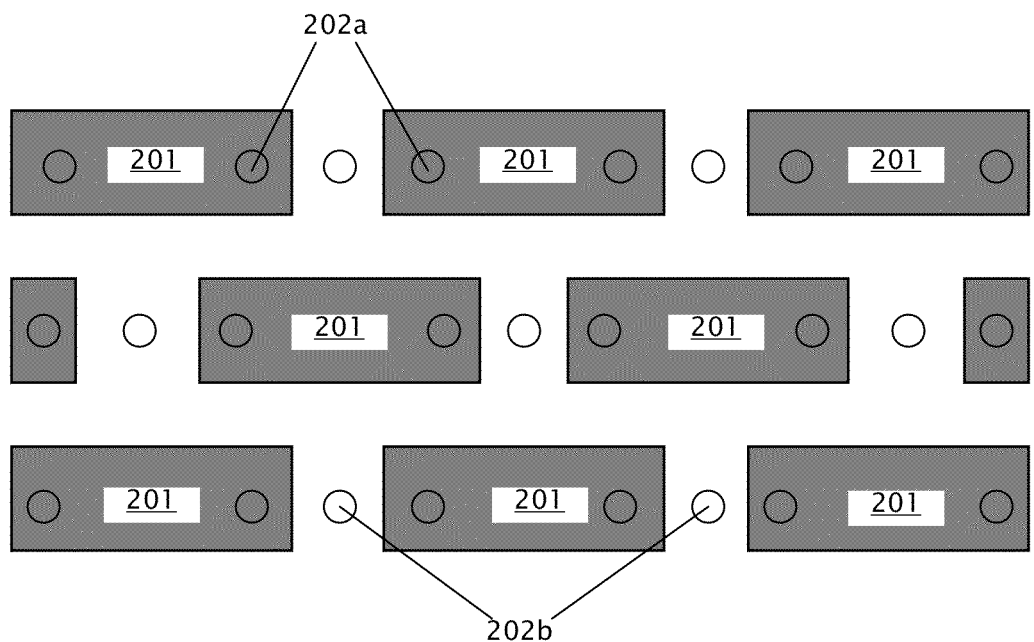
FIG. 2 illustrates a side view of an embodiment of a first surface layer of configurable integrated tamper detection circuitry.

Each of the external surface layers includes a plurality of conductive sections, such as conductive sections 103a-b. Two surface layers, an outer layer and an inner layer, are shown in the embodiment of FIG. 2. The conductive sections may be made from any appropriate conductive material, such as a metal. The inner surface layer shown in FIG. 1 includes conductive sections 103a, and the outer surface layer shown in FIG. 1 includes conductive sections 103b. The surface layers do not form a single conductive area around the protected circuits 101, and the individual conductive sections are not in contact with one another. However, the conductive sections in the two surface layers overlap with one another, requiring a breach of multiple surface sections to gain physical access to protected memory 101. The surface layers are segmented into the conductive sections so as to provide as much coverage of protected memory 101 as feasible. Each conductive trace 104 may include a plurality of physical wires, as necessary to provide at least two electrical connections to programmable interconnect 102 on the internal surface of each conductive section. The physical layout of inner surface layers (such as the surface layer including conductive surface sections 103a) include holes such that conductive traces 104 may extend to outer surface layers (such as the surface layer including conductive sections 103b) without touching the conductive sections that make up the inner surface layer.

Tampering sensor/response module 105 is connected to programmable interconnect 102. The tampering sensor/response module 105 detects a break in any of the circuits of conductive traces 104 or conductive sections, as well as detecting unintended connections between conductive sections that may result from deformation or pressing of a conductive section such that it contacts another nearby conductive section. The tampering sensor/response module 105 may give an alarm and/or erase sensitive information from the protected memory 101 if tampering is detected by the tampering sensor/response module 105.

FIG. 1 is shown for illustrative purposes only. Various embodiments of configurable integrated tamper detection circuitry may include any appropriate number of surface layers with any appropriate number, shape, and orientation of conductive sections connected to the programmable interconnect 102. Also, any appropriate number of tampering sensors and response modules may be included. At least two, but preferably three or more surface layers, each comprising a plurality of conductive sections, may be formed around a protected memory 101. The separation between surface layers is large enough to be reliably manufactured, but small enough that contact between neighboring surface layers is ensured if sufficient external pressure is applied to an external surface layer. The surface layers prevent direct access to the protected memory 101 in a straight line, forcing an attacker to remove one or more conductive sections, or bend a microelectronic-scale drill to bypass the surface layers. The conductive layers may be any appropriate shape, such as long, thin stripes, meanders, or similar structures. Use of conductive sections in the form of thin, long stripes improves tamper detection sensitivity by providing many potential contact points where the conductive sections are sensitive to physical deformation. The conductive sections comprising the surface layers completely surround the protected memory 101 in three dimensions.

FIG. 2 illustrates a side view of an embodiment of a first surface layer of configurable integrated tamper detection circuitry. The surface layer, including coplanar conductive sections 201 shown in FIG. 2, may correspond to the inner surface layer including conductive sections 103a shown in FIG. 1. The locations of electrical connections 202a on the inner surface of conductive sections 201 are shown, wherein the electrical connections 202a correspond to conductive traces 104 that connect to the conductive sections as shown in FIG. 1, and connect the conductive sections 201 to the programmable interconnect 102. Conductive traces 202b are shown extending in between conductive sections 201. Conductive traces 202b also connect to the programmable interconnect, and to one or more outer surface layers of conductive sections (such as, for example, the second surface layer including conductive sections 103b in FIG. 1). The conductive traces 202b may include a plurality of physical wires as necessary to provide at least two electrical connections to programmable interconnect 102 the internal surface of each conductive section.

Figure 3:
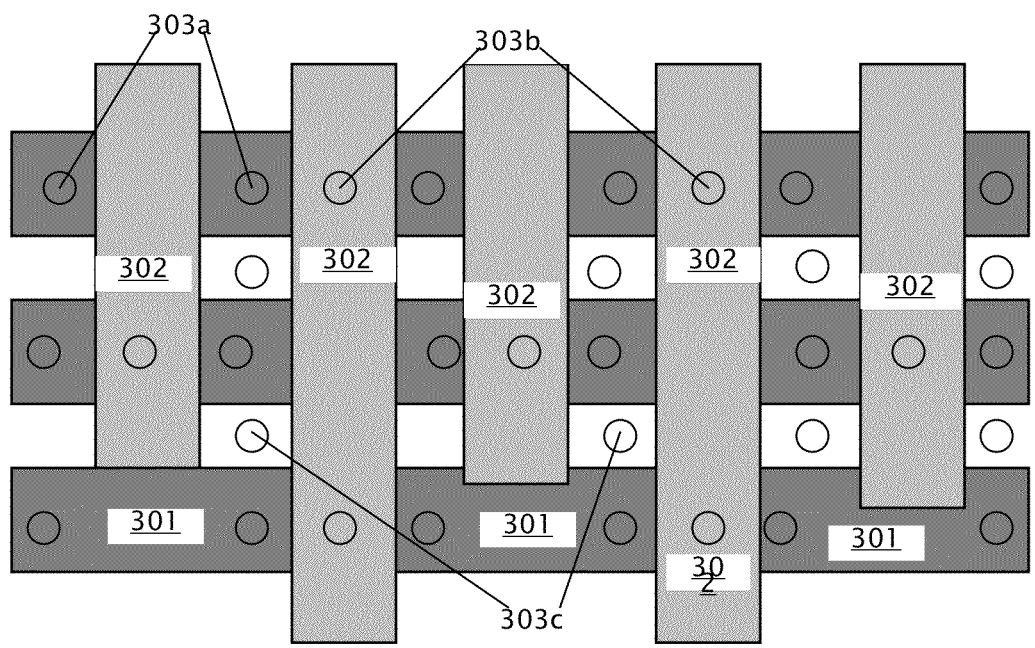
FIG. 3 illustrates a side view of an inner surface layer of configurable integrated tamper detection circuitry with a perpendicular outer surface layer.
Figure 4:
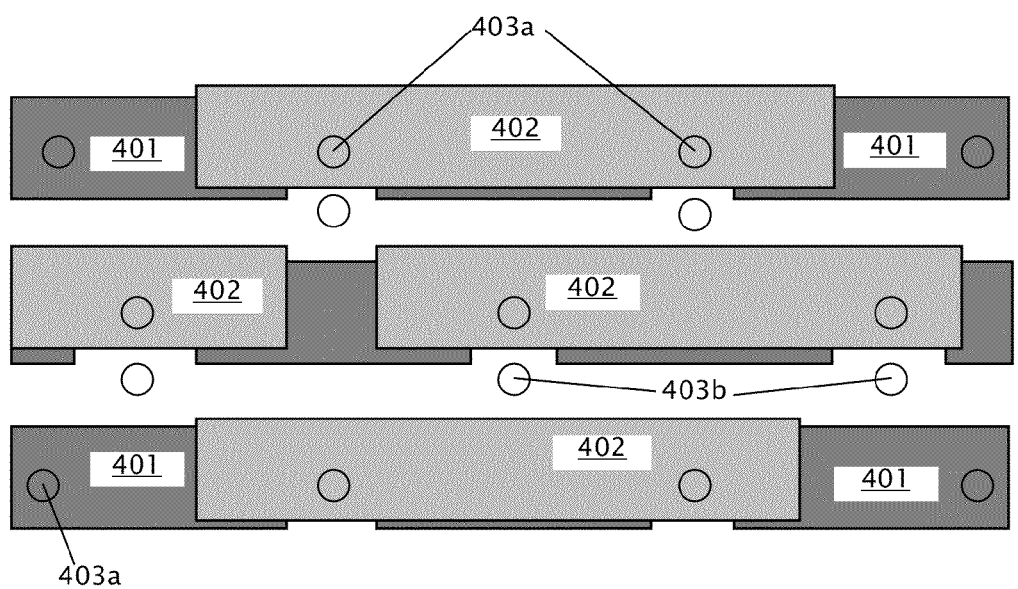
FIG. 4 illustrates a side view of an inner surface layer of configurable integrated tamper detection circuitry with a parallel outer surface layer.

The conductive sections making up an outer surface layer may be oriented in any appropriate direction with respect to the conductive sections making up an adjacent inner surface layer; for example, they may be perpendicular (rotated by (90°), as shown in FIG. 3, or parallel to one another, as shown in FIG. 4. In FIG. 3, coplanar conductive sections 301 make up an inner surface layer, and perpendicular coplanar conductive sections 302 make up an outer surface layer. Electrical connections 303a represent conductive traces that connect the conductive sections 301 of the inner surface layer to the programmable interconnect, and electrical connections 303b represent conductive traces that connect the conductive sections 302 of the outer surface layer to the programmable interconnect. Conductive traces 303c extend through the inner and outer surface layers to one or more additional outer surface layers. Any additional outer surface layers may be added, including conductive sections that are oriented in any appropriate direction with respect to the other surface layers. Adjacent surface layers made up of perpendicular conductive sections, such as are shown in FIG. 3, may increase the possible contact points between the conductive sections as compared to adjacent surface layers made of parallel conductive sections, as shown in FIG. 4.

In FIG. 4, coplanar conductive sections 401 make up an inner surface layer, and parallel coplanar conductive sections 402 make up an outer surface layer. Electrical connections 403a represent conductive traces that connect the conductive sections 401 of the inner surface layer to the programmable interconnect, and electrical connections 403b represent conductive traces that connect the conductive sections 402 of the outer surface layer to the programmable interconnect. Conductive traces 403c extend through the inner and outer surface layers to one or more additional outer surface layers. Any additional surface layers may be added, including conductive sections that are oriented in any appropriate direction with respect to the other surface layers.

Figure 5A:
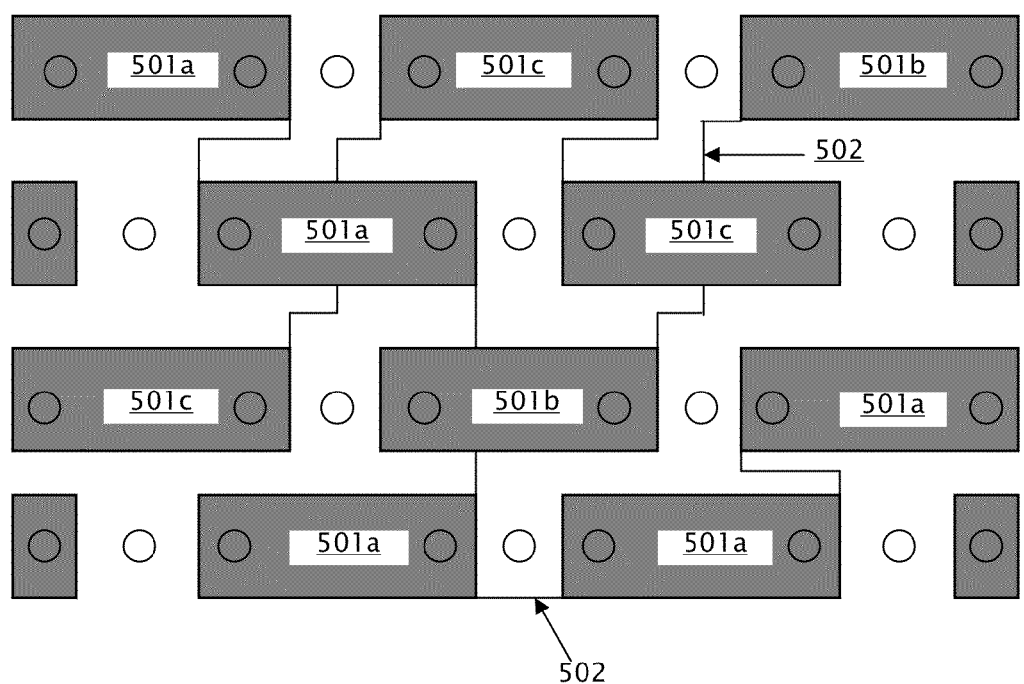
FIGS. 5a-b illustrates exemplary circuit connections and contact points between circuits in a surface layer of configurable integrated tamper detection circuitry.
Figure 5B:
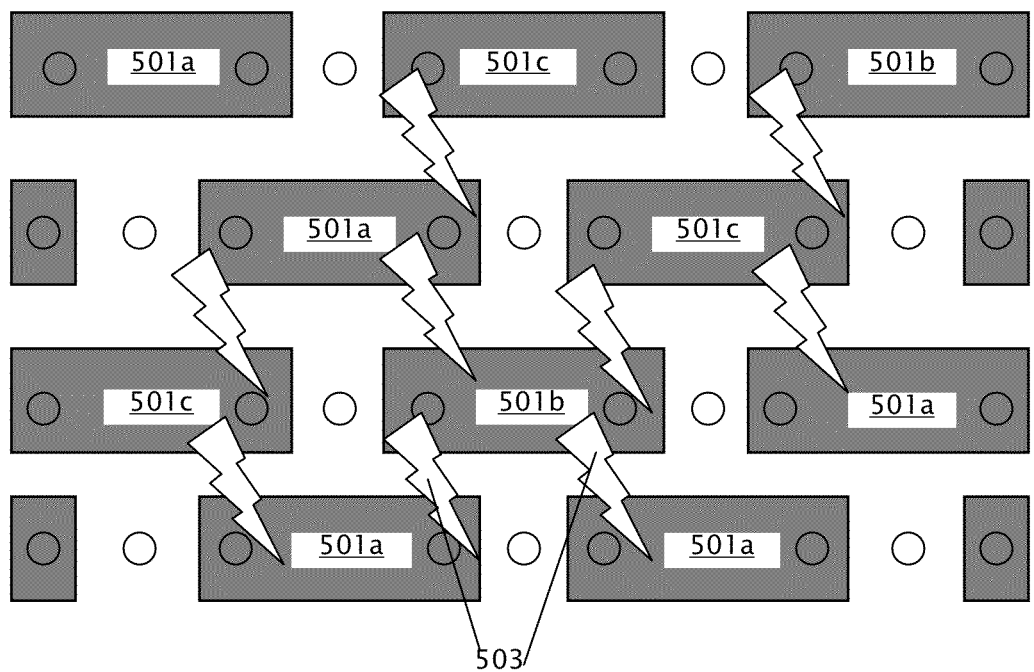

FIG. 5a illustrates example circuit connections in the first surface layer of configurable integrated tamper detection circuitry of FIG. 2, and FIG. 5b illustrates corresponding contact points between the circuits that may trigger a tamper response. Conductive sections 501a form a first circuit, conductive sections 501b form a second circuit, and conductive section 501c form a third circuit. The connections 502, in FIG. 5a show the electrical connections between conductive sections in the various circuits, and the sparks 503 in FIG. 5b show where connecting two neighboring conductive sections may trigger a tamper response, if the different circuits are of sufficiently different potential in steady state. The circuit connections are formed via the switches in the programmable interconnect 102, and any conductive section may be made a part of any circuit in various embodiments. Circuits may also include conductive sections located in different surface layers. The circuits of conductive sections are configured to form device-specific integrated tamper detection circuitry.

Figure 6:
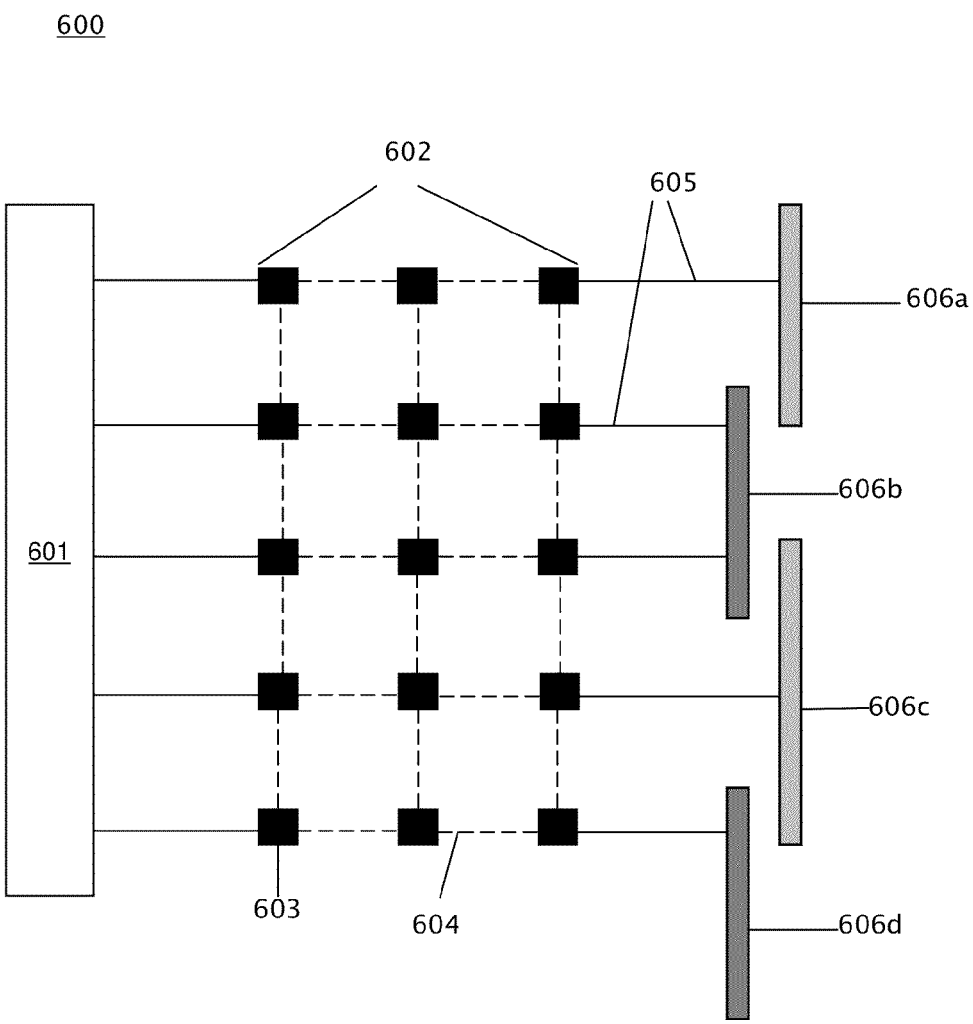
FIG. 6 illustrates a top view of an embodiment of a programmable interconnect for configurable integrated tamper detection circuitry before switch configuration.
Figure 7:
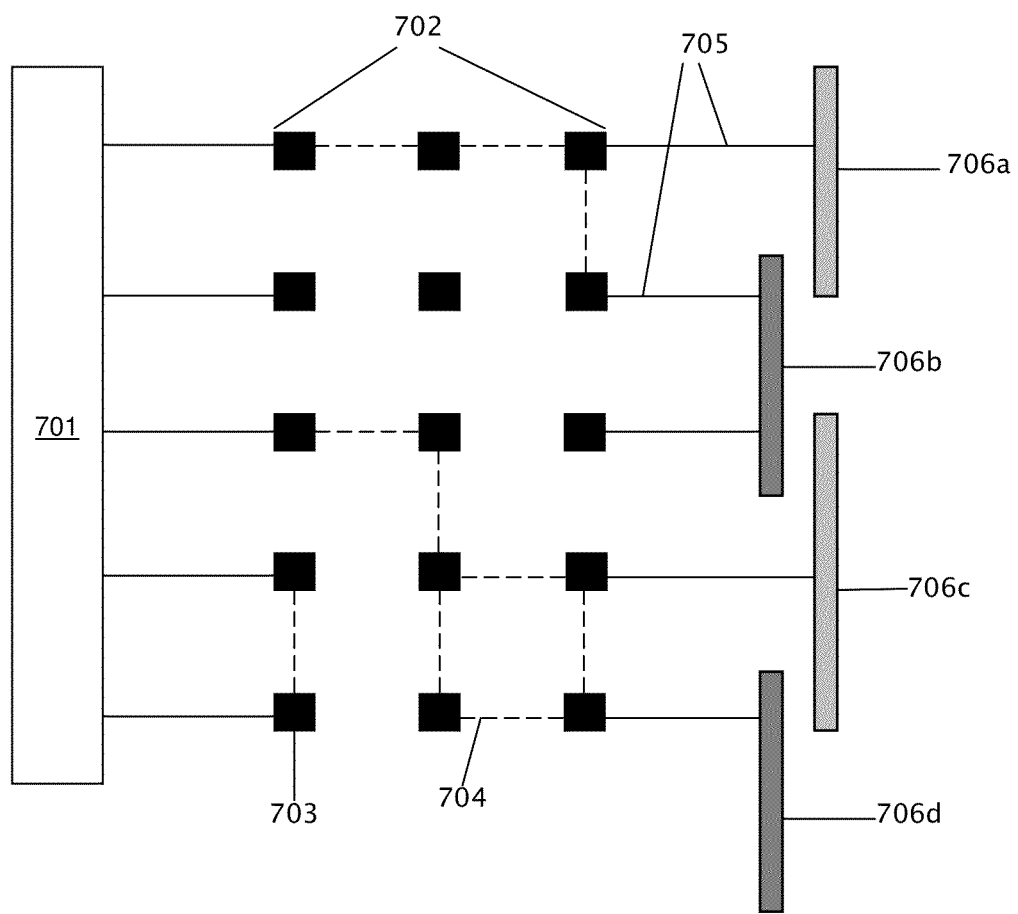
FIG. 7 illustrates a top view of the programmable interconnect for configurable integrated tamper detection circuitry of FIG. 6 after switch configuration.

FIG. 6 illustrates a top view of an embodiment of an exemplary programmable interconnect for configurable integrated tamper detection circuitry before switch configuration. The programmable interconnect 602 is made up of a set of switches 603 connected by switch connections 604. Programmable interconnect is connected to an internal tamper detection/response module 601, and via conductive traces 605 to surface layers comprising conductive sections 606a-d. Coplanar conductive sections 606b and 606d are part of an inner surface layer, and coplanar conductive sections 606a and 606c are part of an outer surface layer. Switches 603 of programmable interconnect 602 may include multiple layers of independently programmed switchboxes. FIG. 7 illustrates a top view of the configurable integrated tamper detection circuitry of FIG. 6 after switch configuration. The switches 703 that make up programmable interconnect 702 are configured such that a portion of switch connections 704 are not active, grouping conductive sections connected to the switches 703 into various circuits. For example, conductive sections 706a and 706b are part of a first circuit, and conductive sections 706c and 706d are part of a second circuit. Contact between conductive section 706b and conductive section 706c may therefore cause tampering detection/response module 701 to give an alarm. Programmable interconnect 602/702 is shown for exemplary purposes only; a programmable interconnect may include any appropriate number and type of switches connected in any appropriate manner. For example, the switches may be laid out in three dimensions in some embodiments, and may be configured such that any conductive section may be made part of any circuit. The number and layout of switches may be determined by the number and layout of conductive sections that make up the configurable integrated tamper response circuitry.

FIG. 8 illustrates a method 800 for switch configuration for a programmable interconnect for integrated tamper detection circuitry. The switch configuration of the programmable interconnect determines how the various conductive sections that make up the two or more surface layers are grouped into circuits having different potentials. In block 801, a listing of possible switch configurations for the programmable interconnect is determined. The list may be determined using a RNG. The RNG may be seeded from a device-internal source, or using an external seed in various embodiments. If external seeding is used, then generation of possible switch configurations using the externally seeded RNG may be performed in a secured manufacturing area. Device-specific information, such as a chip serial number, may also be incorporated into the RNG state. The RNG may be integrated into the integrated tamper detection circuitry in some embodiments, or may be external in other embodiments.

In block 802, a search algorithm is used to select an appropriate switch configuration for the programmable interconnect from the list of possible switch configurations determined in block 801. The search algorithm may be constructed offline in the event more processing power is needed than may be available on an embedded system. Constructive enumeration may be targeted, creating configurations that are more probable to be valid connections than completely random searching. Possible switch configurations that satisfy connectivity, sensitivity, or other requirements may be identified; the requirements may be system-dependent. If external testing and verification are needed, a switch configuration may be exported to a programmable interconnect for testing, so that external tooling may verify the switch configuration. Exporting the switch configuration for testing may be performed in, for example, a secure manufacturing vault; high-assurance devices will not export their switch configuration. An optimization criterion that may be used in block 802 to select a switch configuration is to maximize the physical length where conductive sections of different potential (i.e., conductive sections that are part of different circuits) are adjacent to each other.

In block 803, a selected switch configuration is committed to the switches in the programmable interconnect. Any random input used during configuration generation may be zeroized upon completion of switch configuration. The selected switch configuration of the programmable interconnect is sensitive information. In some embodiments, the programmable interconnect is not reprogrammable. A fuse that gates access to configuration registers in the programmable interconnect may restrict access to the selected switch configuration; removing or sealing the fuse prevents further access to the switch configuration after configuration is completed, and may disallow reprogramming of the programmable interconnect. Switch configuration may alternately be stored in write-only memory, making the switch configuration inaccessible, but allowing reprogramming of the programmable interconnect by rewriting the write-only memory. The switch configuration of the programmable interconnect may be reprogrammed at startup, or regularly during normal operations, by repeating blocks 801-803 of method 800 by, for example, an embedded reprogramming module internal to the configurable integrated tamper detection circuitry. The reprogramming module may include an internal RNG, or may use an RNG that is part of the computing system in which the configurable integrated tamper detection circuitry is located. This requires a reconfigurable switch connection network, and therefore is not applicable to systems using switches that are programmed permanently, such as those based on electronic fuses (e-fuses).

Figure 9:
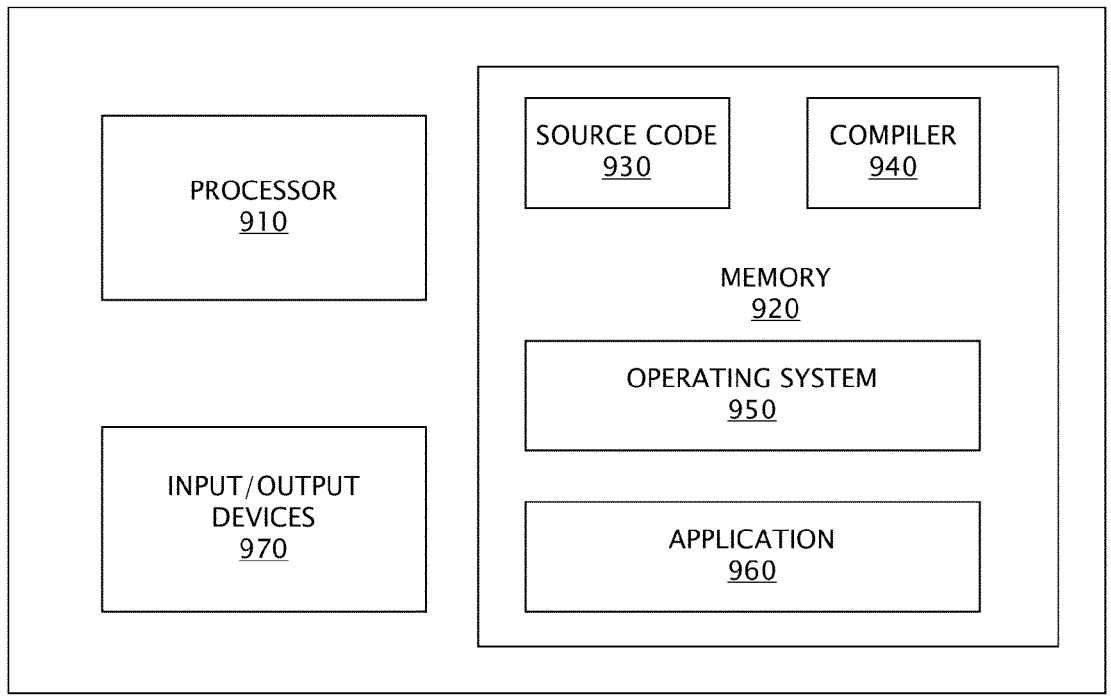
FIG. 9 illustrates a computer that may be used in conjunction with embodiments of integrated tamper detection circuitry.

FIG. 9 illustrates an example of a computer 900 that may be utilized by exemplary embodiments of configurable integrated tamper detection circuitry as embodied in software. Various operations discussed above may utilize the capabilities of the computer 900. One or more of the capabilities of the computer 900 may be incorporated in any element, module, application, and/or component discussed herein.

The computer 900 includes, but is not limited to, PCs, workstations, laptops, PDAs, palm devices, servers, storages, and the like. Generally, in terms of hardware architecture, the computer 900 may include one or more processors 910, memory 920, and one or more input and/or output (I/O) devices 970 that are communicatively coupled via a local interface (not shown). The local interface can be, for example but not limited to, one or more buses or other wired or wireless connections, as is known in the art. The local interface may have additional elements, such as controllers, buffers (caches), drivers, repeaters, and receivers, to enable communications. Further, the local interface may include address, control, and/or data connections to enable appropriate communications among the aforementioned components.

The processor 910 is a hardware device for executing software that can be stored in the memory 920. The processor 910 can be virtually any custom made or commercially available processor, a central processing unit (CPU), a digital signal processor (DSP), or an auxiliary processor among several processors associated with the computer 900, and the processor 910 may be a semiconductor based microprocessor (in the form of a microchip) or a macroprocessor.

The memory 920 can include any one or combination of volatile memory elements (e.g., random access memory (RAM), such as dynamic random access memory (DRAM), static random access memory (SRAM), etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 920 may incorporate electronic, magnetic, optical, and/or other types of storage media. Note that the memory 920 can have a distributed architecture, where various components are situated remote from one another, but can be accessed by the processor 910.

The software in the memory 920 may include one or more separate programs, each of which comprises an ordered listing of executable instructions for implementing logical functions. The software in the memory 920 includes a suitable operating system (O/S) 950, compiler 940, source code 930, and one or more applications 960 in accordance with exemplary embodiments. As illustrated, the application 960 comprises numerous functional components for implementing the features and operations of the exemplary embodiments. The application 960 of the computer 900 may represent various applications, computational units, logic, functional units, processes, operations, virtual entities, and/or modules in accordance with exemplary embodiments, but the application 960 is not meant to be a limitation.

The operating system 950 controls the execution of other computer programs, and provides scheduling, input-output control, file and data management, memory management, and communication control and related services. It is contemplated by the inventors that the application 960 for implementing exemplary embodiments may be applicable on all commercially available operating systems.

Application 960 may be a source program, executable program (object code), script, or any other entity comprising a set of instructions to be performed. When a source program, then the program is usually translated via a compiler (such as the compiler 940), assembler, interpreter, or the like, which may or may not be included within the memory 920, so as to operate properly in connection with the O/S 950. Furthermore, the application 960 can be written as an object oriented programming language, which has classes of data and methods, or a procedure programming language, which has routines, subroutines, and/or functions, for example but not limited to, C, C++, C#, Pascal, BASIC, API calls, ASP scripts, FORTRAN, COBOL, Perl, Java, ADA, .NET, and the like.

The I/O devices 970 may include input devices such as, for example but not limited to, a mouse, keyboard, scanner, microphone, camera, etc. Furthermore, the I/O devices 970 may also include output devices, for example but not limited to a printer, display, etc. Finally, the I/O devices 970 may further include devices that communicate both inputs and outputs, for instance but not limited to, a NIC or modulator/demodulator (for accessing remote devices, other files, devices, systems, or a network), a radio frequency (RF) or other transceiver, a telephonic interface, a bridge, a router, etc. The I/O devices 970 also include components for communicating over various networks, such as the Internet or intranet.

If the computer 900 is a PC, workstation, intelligent device or the like, the software in the memory 920 may further include a basic input output system (BIOS) (omitted for simplicity). The BIOS is a set of essential software routines that initialize and test hardware at startup, start the O/S 950, and support the transfer of data among the hardware devices. The BIOS is stored in some type of read-only-memory, such as ROM, PROM, EPROM, EEPROM or the like, so that the BIOS can be executed when the computer 900 is activated.

When the computer 900 is in operation, the processor 910 is configured to execute software stored within the memory 920, to communicate data to and from the memory 920, and to generally control operations of the computer 900 pursuant to the software. The application 960 and the O/S 950 are read, in whole or in part, by the processor 910, perhaps buffered within the processor 910, and then executed.

When the application 960 is implemented in software it should be noted that the application 960 can be stored on virtually any computer readable medium for use by or in connection with any computer related system or method. In the context of this document, a computer readable medium may be an electronic, magnetic, optical, or other physical device or means that can contain or store a computer program for use by or in connection with a computer related system or method.

The application 960 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium.

More specific examples (a nonexhaustive list) of the computer-readable medium may include the following: an electrical connection (electronic) having one or more wires, a portable computer diskette (magnetic or optical), a random access memory (RAM) (electronic), a read-only memory (ROM) (electronic), an erasable programmable read-only memory (EPROM, EEPROM, or Flash memory) (electronic), an optical fiber (optical), and a portable compact disc memory (CDROM, CD R/W) (optical). Note that the computer-readable medium could even be paper or another suitable medium, upon which the program is printed or punched, as the program can be electronically captured, via for instance optical scanning of the paper or other medium, then compiled, interpreted or otherwise processed in a suitable manner if necessary, and then stored in a computer memory.

In exemplary embodiments, where the application 960 is implemented in hardware, the application 960 can be implemented with any one or a combination of the following technologies, which are well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

The technical effects and benefits of exemplary embodiments include integrated tamper detection circuitry that is relatively easy to manufacture and provides strong protection for an internal protected memory.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. Tamper detection circuitry for a protected memory, comprising:
    a first surface layer surrounding the protected memory, the first surface layer comprising a first plurality of conductive sections;
    a second surface layer surrounding the protected memory, the second surface layer being located outside of the first surface layer, the second surface layer comprising a second plurality of conductive sections;
    a programmable interconnect located inside the first surface layer, the programmable interconnect being connected to each conductive section of the first and second plurality of conductive sections by a plurality of conductive traces, the programmable interconnect comprising a plurality of switches that are configured to group the conductive sections of the first and second plurality of conductive sections into a plurality of circuits, each of the plurality of circuits having a different respective voltage;
    a tamper detection and response module, the tamper detection and response module configured to detect tampering based on a conductive section that is part of a first circuit coming into physical contact with a conductive section that is part of a second circuit; and
    a random number generator that is internal to the programmable interconnect and located inside of the first surface layer and the second surface layer, wherein the grouping of the conductive sections of the first and second plurality of conductive sections into the plurality of circuits is determined based on an output of the random number generator.

2. The tamper detection circuitry of claim 1, wherein the tamper detection circuitry is integrated into one of a chip and a circuit board on which the protected memory is located.

3. The tamper detection circuitry of claim 1, wherein the first plurality of conductive sections are oriented in a direction that is parallel to the second plurality of conductive sections.

4. The tamper detection circuitry of claim 1, wherein the first plurality of conductive sections are oriented in a direction that is perpendicular to the second plurality of conductive sections.

5. The tamper detection circuitry of claim 1, wherein the conductive traces that connect the second plurality of surface layers to the programmable interconnect extend through holes located in the first surface layer located between the first plurality of conductive sections.

6. The tamper detection circuitry of claim 1, further comprising one or more additional surface layers located outside of the second surface layer, each of the additional surface layers comprising a respective plurality of conductive sections that are connected to the programmable interconnect via conductive traces.

7. The tamper detection circuitry of claim 1, wherein the tamper detection and response module is further configured to detect tampering in the event that a break occurs in a circuit of the plurality of circuits.

8. The tamper detection circuitry of claim 1, further comprising an embedded reprogramming module that is internal to the tamper detection circuitry, the embedded reprogramming module configured to reprogram the grouping of the conductive sections of the first and second plurality of conductive sections by the programmable interconnect into a second plurality of circuits based on the random number generator that is internal to the programmable interconnect during operation of the tamper detection circuitry.

9. A method for configuring tamper detection circuitry for a protected memory, the tamper detection circuitry comprising a programmable interconnect comprising a plurality of switches, the programmable interconnect being connected to a first surface layer surrounding the protected memory, the first surface layer comprising a first plurality of conductive sections, and a second surface layer surrounding the protected memory, the second surface layer being located outside of the first surface layer, the second surface layer comprising a second plurality of conductive sections, wherein the first and second plurality of conductive sections are connected to the programmable interconnect by a plurality of conductive traces, the method comprising:
  determining a plurality of possible switch configurations for the programmable interconnect based on a random number generator that is internal to the programmable interconnect, wherein the plurality of possible switch configurations each correspond to different groupings of the first and second plurality of conductive sections into a plurality of circuits;
  selecting a first switch configuration from the plurality of switch configurations; and
  committing the first switch configuration to the switches that comprise the programmable interconnect such that the first and second plurality of conductive sections are grouped into a plurality of circuits corresponding to the selected switch configuration, wherein each of the plurality of circuits has a different respective voltage.

10. The method of claim 9, further comprising seeding the random number generator with a device-specific quantity or serial number from a chip or circuit board on which the protected memory is located.

11. The method of claim 9, further comprising sealing a fuse that disallows changing the switch configuration of the programmable interconnect after committing the selected switch configuration to the switches that comprise the programmable interconnect.

12. The method of claim 9, further comprising:
  determining, during operation of the tamper detection circuitry, a second plurality of possible switch configurations during operation of the tamper protection circuitry based on the random number generator that is internal to the programmable interconnect by an embedded reprogramming module that is internal to the tamper detection circuitry;
  selecting a second switch configuration from the second plurality of switch configurations; and
  committing the second switch configuration to the switches comprising the programmable interconnect.

13. The method of claim 12, wherein the first switch configuration and the second switch configuration are stored in a write-only memory, and further comprising rewriting the first switch configuration with the second switch configuration in the write-only memory by the embedded reprogramming module.

14. The method of claim 9, further comprising detecting tampering by the tamper detection circuitry based on a conductive section that is part of a first circuit coming into physical contact with a conductive section that is part of a second circuit.

15. The method of claim 9, further comprising detecting tampering by the tamper detection circuitry based on a break occurring in a circuit of the plurality of circuits.

16. A computer program product comprising a non-transitory computer readable storage medium containing computer code that, when executed by a computer, implements a method for configuring tamper detection circuitry for a protected memory, the tamper detection circuitry comprising a programmable interconnect comprising a plurality of switches, the programmable interconnect being connected to a plurality of conductive sections by a plurality of conductive traces, wherein the method comprises:
  determining a plurality of possible switch configurations for the programmable interconnect based on a random number generator that is internal to the programmable interconnect, wherein the plurality of possible switch configurations each correspond to different groupings of the first and second plurality of conductive sections into a plurality of circuits;
  selecting a first switch configuration from the plurality of switch configurations; and
  committing the first switch configuration to the switches that comprise the programmable interconnect such that the first and second plurality of conductive sections are grouped into a plurality of circuits corresponding to the selected switch configuration, wherein each of the plurality of circuits has a different respective voltage.

17. The computer program product according to claim 16, further comprising seeding the random number generator with a device-specific quantity or serial number from a chip or circuit board on which the protected memory is located.

18. The computer program product according to claim 16, further comprising:
  determining, during operation of the tamper detection circuitry, a second plurality of possible switch configurations during operation of the tamper protection circuitry based on the random number generator that is internal to the programmable interconnect by an embedded reprogramming module that is internal to the tamper detection circuitry;

selecting a second switch configuration from the second plurality of switch configurations; and committing the second switch configuration to the switches comprising the programmable interconnect.

* * * * *